(12) United States Patent
Mann

(10) Patent No.: US 6,427,634 B1
(45) Date of Patent: Aug. 6, 2002

(54) PET TOY

(75) Inventor: Charles D. Mann, 1513 E. Burnsville Pkwy., Burnsville, MN (US) 55337

(73) Assignee: Charles D. Mann, Burnsville, MN (US)

( * ) Notice: Subject to any disclaimer, the term of this patent is extended or adjusted under 35 U.S.C. 154(b) by 0 days.

(21) Appl. No.: 09/889,316

(22) PCT Filed: Jul. 28, 1999

(86) PCT No.: PCT/US99/17024

§ 371 (c)(1),
(2), (4) Date: Jul. 11, 2001

(87) PCT Pub. No.: WO00/41560

PCT Pub. Date: Jul. 20, 2000

Related U.S. Application Data

(60) Provisional application No. 60/115,837, filed on Jan. 14, 1999.

(51) Int. Cl.[7] .............................................. A01K 29/00
(52) U.S. Cl. ..................... 119/709; 119/707; 119/710
(58) Field of Search ................................. 119/709, 702, 119/710, 707, 711; D30/160; 426/104, 132, 135; 273/118 R; 446/386

(56) References Cited

U.S. PATENT DOCUMENTS

| | | |
|---|---|---|
| 1,006,182 A | 10/1911 | Cousin |
| 1,022,112 A | 4/1912 | Smith |
| 1,031,095 A | 7/1912 | Smith |
| 1,149,170 A | 8/1915 | Allis |
| 1,483,165 A | 2/1924 | Eaton |
| 1,534,964 A | 4/1925 | Kahnweiler |
| 1,843,864 A | 2/1932 | Burnett |
| 2,086,631 A | 7/1937 | Munro ........................ 119/711 |
| 2,194,736 A | 3/1940 | Bruler ......................... 119/709 |
| 2,610,851 A | 9/1952 | Jones ........................... 119/710 |
| D188,179 S | 6/1960 | Tay ............................... D12/2 |
| 3,071,476 A | 1/1963 | Werft et al. |
| 3,104,648 A | 9/1963 | Fisher .......................... 119/29 |
| 3,107,651 A | 10/1963 | Beck ............................ 119/29 |
| 3,122,129 A | 2/1964 | Wise ............................ 119/51 |

(List continued on next page.)

FOREIGN PATENT DOCUMENTS

| | | |
|---|---|---|
| CA | 2240524 | 6/1997 |
| WO | WO 99/25183 | 5/1999 |

OTHER PUBLICATIONS

"Kitt'N Gym" Advertisement, circa 1989.
"Learn & Listen" Advertisement, circa 1990.

(List continued on next page.)

*Primary Examiner*—Yvonne R. Abbott
(74) *Attorney, Agent, or Firm*—Westman, Champlin & Kelly, P.A.

(57) ABSTRACT

A non-consumable pet toy comprises a three-dimensional body (12) formed of substantially solid resilient material with a trapper cavity (14 that has first (20) and second (18) opposing walls that extend into the body. At least one end of the trapper cavity is open to an external surface of the body to permit insertion of an animal attractant (16) into the trapper cavity. A bias cavity (26) is formed in the body adjacent the trapper cavity and spaced from the first wall (20). A bias member (30) is formed between the bias cavity (26) and that much of the trapper cavity (14) defined by at least the first wall (20). The bias member is operatively associated with the trapper cavity to bias the first wall against an attractant in the trapper cavity so that the aftractant is retained between the first (20) and second (18) walls. In one form the trapper cavity (14) includes large head-like portions (22, 24) at the ends of a shank-like portion. In another form, a second trapper cavity (14) and bias cavity (26) complement the first to receive an animal attractant in the second trapper cavity.

21 Claims, 4 Drawing Sheets

U.S. PATENT DOCUMENTS

| | | | | |
|---|---|---|---|---|
| 3,664,303 A | | 5/1972 | Baensch | 119/51 |
| 3,785,347 A | | 1/1974 | Dinnerstein | 119/29 |
| 3,871,334 A | | 3/1975 | Axelrod | 119/29.5 |
| 3,899,607 A | | 8/1975 | Miller et al. | 426/285 |
| 3,964,438 A | | 6/1976 | Rodemeyer | 426/132 |
| 4,032,665 A | | 6/1977 | Miller et al. | 426/104 |
| 4,513,014 A | | 4/1985 | Edwards | 426/132 |
| 4,557,219 A | | 12/1985 | Edwards | 119/29.5 |
| D287,988 S | | 1/1987 | Billinghurst | D21/204 |
| 4,802,444 A | | 2/1989 | Markham et al. | 119/29 |
| D307,339 S | | 4/1990 | Markham et al. | D30/160 |
| 4,919,083 A | | 4/1990 | Axelrod | 119/29 |
| D308,122 S | | 5/1990 | Markham et al. | D30/160 |
| D314,455 S | | 2/1991 | Morton | D30/160 |
| 5,025,753 A | | 6/1991 | Schneider | 119/51.03 |
| 5,069,261 A | * | 12/1991 | Ji | 150/150 |
| 5,123,378 A | | 6/1992 | Bayne | 119/29 |
| 5,165,363 A | | 11/1992 | McGinty | 119/18 |
| RE34,352 E | | 8/1993 | Markham et al. | 119/710 |
| 5,232,130 A | | 8/1993 | Woodard | 222/464 |
| 5,263,436 A | | 11/1993 | Axelrod | 119/29 |
| D343,262 S | | 1/1994 | Axelrod | D30/160 |
| D344,161 S | | 2/1994 | Markham | D30/160 |
| D349,786 S | | 8/1994 | Markham | D30/160 |
| 5,339,771 A | | 8/1994 | Axelrod | 119/710 |
| D350,629 S | * | 9/1994 | Scrani | D1/125 |
| 5,343,828 A | | 9/1994 | Houghton et al. | 119/51.03 |
| 5,351,652 A | | 10/1994 | Budman et al. | 119/711 |
| D357,952 S | | 5/1995 | Chen | D21/191 |
| D359,147 S | | 6/1995 | Hotta et al. | D30/160 |
| 5,536,007 A | | 7/1996 | Snyder | 273/118 R |
| D373,229 S | | 8/1996 | O'Rourke et al. | D30/160 |
| D373,859 S | | 9/1996 | Markham et al. | D30/160 |
| 5,553,570 A | | 9/1996 | VanNatter, III et al. | 119/709 |
| 5,595,142 A | | 1/1997 | Chill | 119/710 |
| 5,619,954 A | | 4/1997 | Rotondi | 119/707 |
| 5,640,931 A | | 6/1997 | Markham | 119/711 |
| D387,513 S | * | 12/1997 | Mauldin, Jr. | D21/406 |
| D388,559 S | | 12/1997 | Mauldin, Jr. | D30/160 |
| D393,110 S | * | 3/1998 | Mauldin, Jr. | D30/160 |
| 5,799,616 A | | 9/1998 | McClung, III | 119/709 |
| 5,813,366 A | | 9/1998 | Mauldin, Jr. | 119/710 |
| 5,819,690 A | | 10/1998 | Brown | 119/707 |
| 5,832,877 A | | 11/1998 | Markham | 119/710 |
| 5,857,431 A | | 1/1999 | Peterson | 119/710 |
| 5,865,146 A | | 2/1999 | Markham | 119/707 |
| 5,865,147 A | | 2/1999 | Rubin | 119/711 |
| 5,904,118 A | | 5/1999 | Markham | 119/707 |
| 5,947,061 A | | 9/1999 | Markham et al. | 119/710 |
| 5,965,182 A | * | 10/1999 | Lindgren | 119/707 |
| 6,129,053 A | | 10/2000 | Markham et al. | 119/710 |

OTHER PUBLICATIONS

"Cat Pursuit Game" Advertisement, circa 1990.

"Dog Play Toy" Advertisement, circa 1990.

Fritz Cat Toys Advertisement, circa 1992.

"Kong Stuffing" Advertisement, Pet Business Magazine, May 1995.

Recipe for the Perfect Dog, Kong Company brochure, 1997.

"Biscuit Ball" Advertisement, Pet Business, Oct. 1998.

* cited by examiner

PET TOY

CROSS REFERENCE TO RELATED APPLICATION

This application is a Section 371 Application of International Application No. PCT/US99/17024 filed Jul. 28, 1999, which in turn claims benefit of U.S. Provisional Application No. 60/115,837, filed Jan. 14, 1999.

BACKGROUND OF THE INVENTION

This invention relates to pet toys, and particularly to toys for carnivorous animals such as dogs and cats.

Chewable pet toys provide a variety of beneficial functions for the pet carnivore. Chewing on such toys provides the carnivore with masticatory exercise, as well as dental prophylaxis. Irregular shapes impart erratic movements to the toy when rolled or bounced, thereby provide exercise for the animal. Such toys often provide a training function, teaching the carnivore to chew on the toy, rather than on furniture or other valuable items.

To enhance the attractiveness of the toy to the carnivore, sensory attractants have been incorporated in the toy. These toys attract the carnivore and encourage the carnivore to chew on the toy, rather than on furniture or other personal property. Thus, the sensory attractant is particularly advantageous as a training device for the carnivore. Often, these sensory attractants are an integral part of the toy, molded into the plastic or other material of the toy, making it impossible to remove the attractant without destroying the toy. More recent toys employ a cavity designed to retain a replaceable attractant.

Two examples of toys designed to retain replaceable attractants are "Kong" available from the Kong Company of Denver Colorado and "Nylabone." These toys have hollow cavities in which the attractant is loosely retained until dislodged by the animal. The cavity is open at an end to permit insertion of the attractant, such as a dog biscuit or other treat. The toy is constructed of resilient plastic, such as a non-toxic elastomer, so that the cavity is resiliently crushed by the chewing action of the animal, thereby breaking the attractant. This permits the animal to crush the attractant and dissolve it with the animal's saliva so that part of the attractant is expelled through the opening to the animal, thereby maintaining the interest of the animal. When the attractant is fully removed by the animal, the pet owner may replace the attractant so that the toy may be reused. Another toy is available from Planet Pet, Inc. of Naples, Fla. and described in U.S. Pat. No. 5,813,366 to Mauldin. The Planet Pet toy employs spines within a treat-receiving shaft. The splines bend to grip the attractant to rigidly hold the attractant until dissolved or chewed to a reduced size by the animal. The Planet Pet toy requires insertion of the attractant by simultaneously rotating the attractant to bend the splines while pushing on the attractant to force the attractant into the attractant-receiving shaft. However, the shear strength of many attractants, such as dog biscuits, is inadequate to overcome the reaction force of the splines. As a result, the splines broke the attractant into smaller pieces during insertion, making them easier to remove by the animal. In some cases, the attractant crumbled into such small pieces as to be too small to be gripped by the splines, rendering the toy relatively useless as a sensory attractant holder.

BRIEF SUMMARY OF THE INVENTION

The present invention is directed to a non-consumable pet toy for rigidly holding a replaceable sensory attractant, such as a dog biscuit or other treat, wherein the attractant is not subjected to shear forces that could break the attractant during insertion into the toy.

A non-consumable pet toy according to the present invention comprises a three-dimensional body formed of substantially solid resilient material. The body has a trapper cavity that has first and second opposing walls that extend into the body and define an attractant-retaining space between them. The trappercavity has at least one end open to an external surface of the body to permit insertion of an animal attractant into the trapper cavity. The first and second walls of the trapper cavity terminate at first and second enlarged portions to define a width to the trapper cavity that is greater than a width of the attractant. The body is sufficiently flexible to permit compression in a direction parallel to the width of the trapper cavity and expansion in a direction normal to the width of the trapper cavity, so that a compressive force applied to the body in a direction parallel to the width of the trapper cavity expands the trapper cavity in a direction normal to the width of the trapper cavity to permit insertion of an attractant into the trapper cavity. Upon release of the compressive force the body relaxes to clamp the inserted attractant between the first and second walls.

Preferably, the trapper cavity is in the form of a half-bone with first and second large portions representing heads of the half-bone joined to respective edges of the first and second walls that define a space representing the shank of the half-bone. In some embodiments, a raised portion is optionally included on the external surface of the body adjacent the end of the trapper cavity; the raised portion having a generally half-bone shape complementing the half-bone shape of the trapper cavity. In other embodiments, the body includes a second trapper cavity having third and fourth opposing walls adjacent the first trapper cavity. The second trapper cavity has at least one end open to the external surface of the body to permit insertion of an animal attractant into the second trapper cavity. The open ends of the first and second trapper cavities being adjacent to each other such that the second and fourth walls are adjacent. In these embodiments, the compressive force on the body expands both trapper cavities to permit insertion and clamping of attractants in the trapper cavities. In these forms of the pet toy, a bias bridge may be included between the second and fourth walls to bias the respective second and fourth walls against respective attractants in the first and second trapper cavities.

In preferred embodiments, the pet toy includes a bias cavity in the body and a bias member separating the bias cavity from the trapper cavity. The bias member is operatively associated with the trapper cavity to bias the cavity wall against an attractant in the trapper cavity so that the attractant is retained in the cavity. Preferably, the bias cavities are apertures parallel to the respective trapper cavity and the bias members are continuous bias bridges between the respective bias aperture and trapper cavity.

In all embodiments of the invention, the toy optionally includes a plurality of elongated spaced protrusions on an external surface of the body to generally define a protruding ring on the body. The protrusions promote erratic movement of the toy, holding the interest of the animal.

DETAILED DESCRIPTION

Figure 1:
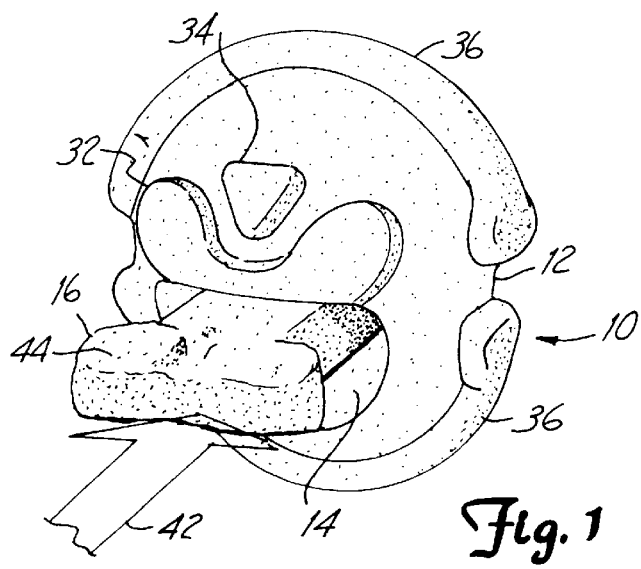
FIG. 1 is a perspective view of a pettoy in accordance with a first embodiment of the present invention showing an attractant held by the toy.

Most animal attractants, such as dog biscuits and the like, have relatively low shear strengths. Such attractants cannot support shear loads and therefore cannot be easily twisted into a pet toy as described in the aforementioned Mauldin patent without breaking. Nevertheless, such attractants often have relatively high compression strengths, such that they can support compression loads. The present invention takes advantage of the relatively high compressive strength of the attractant and is particularly directed to a pet toy wherein the attractant is inserted under a compression force, and is held by the toy under a compression force.

FIGS. 1–4 illustrate a pet toy 10 in accordance with a first embodiment of the present invention. Toy 10 has a generally circular body 12 constructed of a non-consumable, resilient or flexible material, such as a non-toxic elastomer or neoprene plastic. Trapper cavity 14 extends through body 20 and is open at each end thereof to accept a sensory attractant 16 (FIG. 1) to be held within trapper cavity 14. Trapper cavity 14 has opposing walls 18 and 20 that spaced apart by distance smaller than the thickness of sensory attractant 16 when the body of the toy is a relaxed condition. End portions 22 and 24 form terminations for walls 18 and 20 terminate at opposite sides of cavity 14 across the width of the cavity; end portions 22 and 24 extending somewhat away from wall 18 as shown to define a neck portion between walls 18 and 20. Thus, trapper cavity 14 is generally in the shape of a half-bone with a narrow neck portion between walls 18 and 20.

A bias cavity 26 in the form of an aperture extends through body 12 parallel to axis 28 of trapper cavity 14. Aperture 26 forms a bias member 30 in the form of a continuous bridge between aperture 26 and trapper cavity 14. In preferred embodiments, the bridge extends adjacent the neck between walls 18 and 20, as well as adjacent one side of enlarged end portions 22 and 24.

Protrusion 32, generally in the shape of a half-bone similar to trapper cavity 24, is formed on opposite surfaces of body 12 adjacent the openings of the longer wall 18 of the trapper cavity. Protrusion 34, generally in the shape of bias aperture 26, is formed on opposite surfaces of body 12 to provide symmetry to the bias aperture. Protrusions 32 and 34 are provided for aesthetic purposes and to aid in imparting erratic movements to the toy when rolled or bounced. A pair of protrusions 36 are formed about the periphery of the body, each in the shape of a bone, encircling the openings of cavity 14, again enhancing the aesthetics of the toy, as well as providing an irregular shape to the toy to impart erratic movements of the toy when rolled or bounced.

Figure 2:
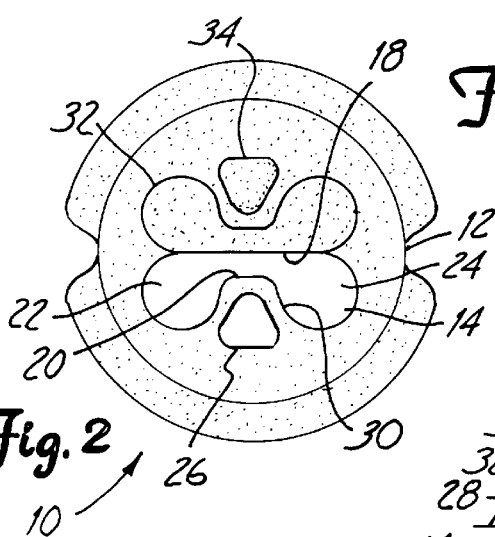
FIGS. 2 and 3 are front and section views, respectively of the pet toy illustrated in FIG. 2.
Figure 4:
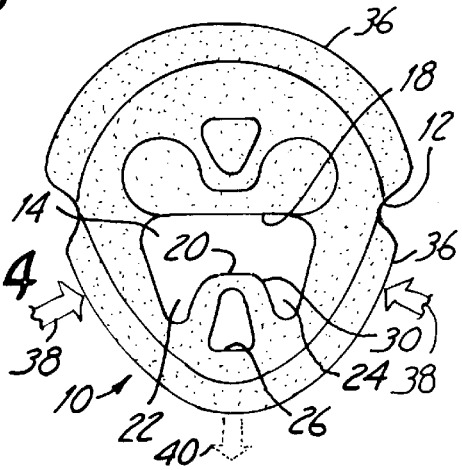
FIG. 4 is a frontal view as in FIG. 2, illustrating the application of force and distortion of the toy to permit insertion of an attractant into the trapper cavity.
Figure 3:
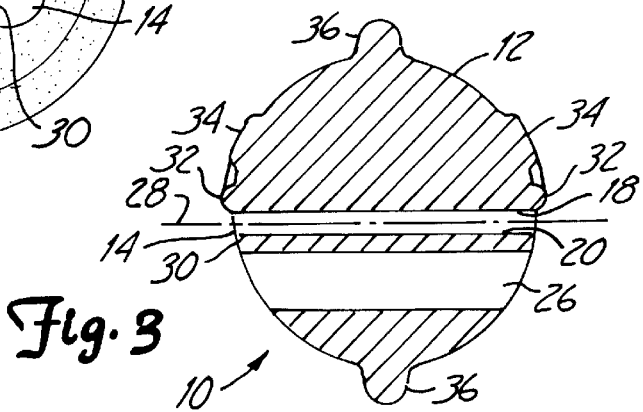

Insertion of sensory attractant 16 into the trapper cavity of the toy may best be explained with particular reference to FIGS. 1, 2 and 4. FIG. 2 is a frontal view of the toy in a relaxed condition, without an attractant in cavity 14. A force applied to the body of the relaxed toy in the direction of arrows 38 (FIG. 4), such as by squeezing between the thumb and fingers of one hand of the pet master. The force deforms body 12 and trapper cavity 14 in the direction of arrow 40, thereby increasing the space between walls 18 and 20 of trapper cavity 14 and decreasing the width of the cavity. Enlarged portions 22 and 24 also deform as shown, making easy the insertion of attractant 16. Attractant 16 is then inserted into the opened cavity and urged by hand in the direction of arrow 42 (FIG. 1) axially into cavity 14. With the attractant fully inserted in cavity 14, the force of arrows 38 is released, allowing the body of the toy to relax resulting in walls 18 and 20 compressing against external surfaces 44 of the attractant, retaining the attractant under the compressive force of the relaxed body. Thus, the body is sufficiently flexible to permit compression along the width of cavity 14 and expansion across cavity 14 to permit easy insertion of the attractant.

Although cavity 14 has been described as half-bone shaped for aesthetic reasons, the enlarged end portions of the cavity cooperate with bias aperture 26 to ease the deformation of the toy for insertion of the attractant. The bias aperture serves to bias bridge 30 against the attractant to retain the attractant in the cavity.

In use, the carnivore chews on the toy in an attempt to loosen and obtain the attractant, thus providing the carnivore with masticatory exercise, as well as dental prophylaxis. The inclusion of the sensory attractant is particularly advantageous as a training device, encouraging the carnivore to chew on the toy, rather than on furniture or other valuable items. Should the animal push or bounce the toy, shape to the toy to impart erratic movements of the toy when rolled or bounced.

Insertion of sensory attractant 16 into the trapper cavity of the toy may best be explained with particular reference to FIGS. 1, 2 and 4. FIG. 2 is a frontal view of the toy in a relaxed condition, without an attractant in cavity 14. A force applied to the body of the relaxed toy in the direction of arrows 38 (FIG. 4), such as by squeezing between the thumb and fingers of one hand of the pet master. The force deforms body 12 and trapper cavity 14 in the direction of arrow 40, thereby increasing the space between walls 18 and 20 of trapper cavity 14 and decreasing the width of the cavity. Enlarged portions 22 and 24 also deform as shown, making easy the insertion of attractant 16. Attractant 16 is then inserted into the opened cavity and urged by hand in the direction of arrow 42 (FIG. 1) axially into cavity 14. With the attractant fully inserted in cavity 14, the force of arrows 38 is released, allowing the body of the toy to relax, resulting in walls 18 and 20 compressing against external surfaces 44 of the attractant, retaining the attractant under the compressive force of the relaxed body. Thus, the body is sufficiently flexible to permit compression along the width of cavity 14 and expansion across cavity 14 to permit easy insertion of the attractant.

Although cavity 14 has been described as half-bone shaped for aesthetic reasons, the enlarged end portions of the cavity cooperate with bias aperture 26 to ease the deformation of the toy for insertion of the attractant. The bias aperture serves to bias bridge 30 against the attractant to retain the attractant in the cavity.

In use, the carnivore chews on the toy in an attempt to loosen and obtain the attractant, thus providing the carnivore with masticatory exercise, as well as dental prophylaxis. The inclusion of the sensory attractant is particularly advantageous as a training device, encouraging the carnivore to chew on the toy, rather than on furniture or other valuable items. Should the animal push or bounce the toy, protrusions 36 assure an erratic movement to the toy upon bouncing or rolling thereby providing exercise for the animal.

Figure 5:
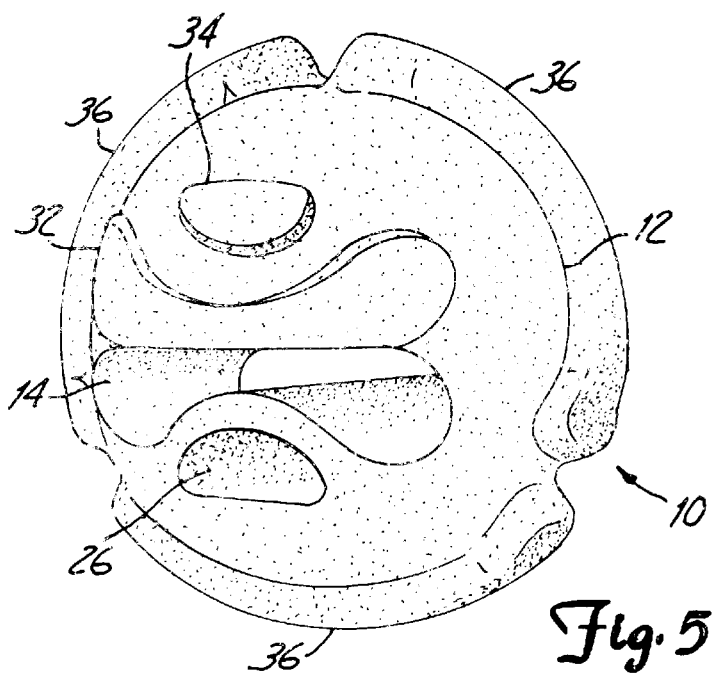
FIGS. 5 and 6 are perspective and frontal views of a pet toy in accordance with a second embodiment of the present invention.
Figure 6:
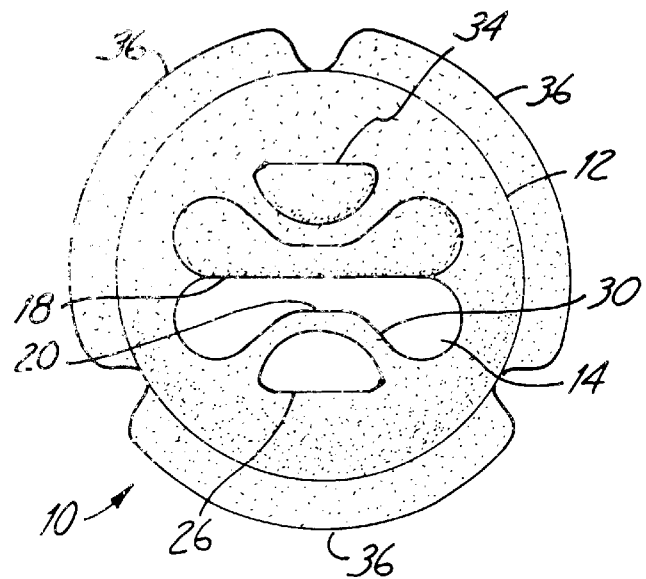

FIGS. 5 and 6 illustrate a second embodiment of the invention where, instead of two protrusions 36, there are three, and the diameter of body 12 is larger than in FIGS, 1–4. The embodiment of FIGS. 5 and 6 is particularly suitable for medium-sized animals, whereas the embodiment illustrated in FIGS. 1–4 is more suited for small animals.

Figure 7:
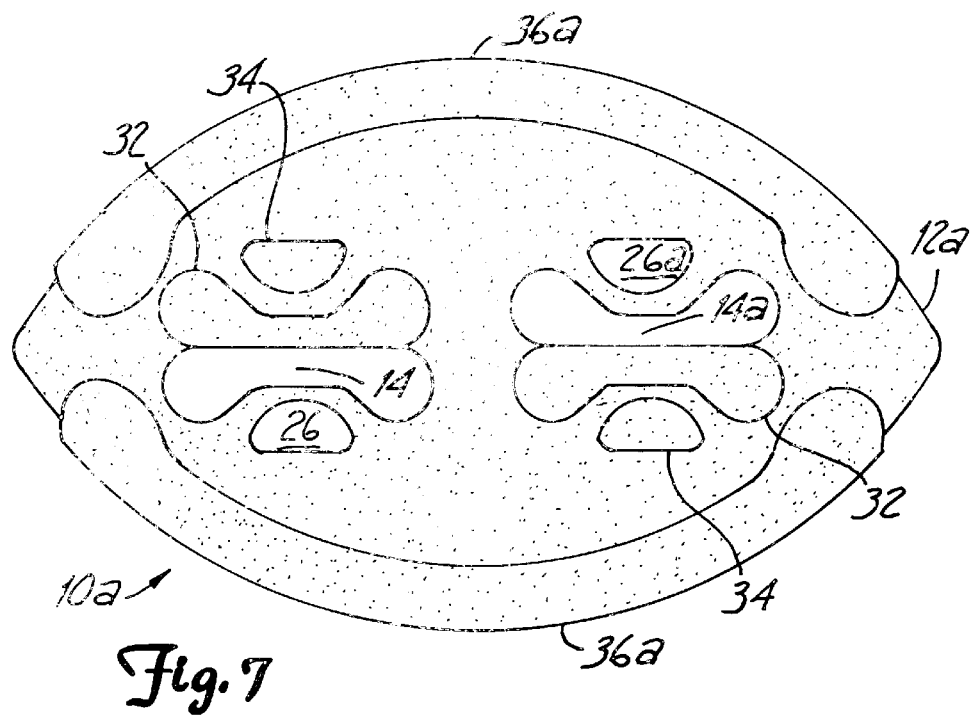
FIGS. 7 an 8 are frontal and top views of a pet toy in accordance with a third embodiment of the present invention.
Figure 8:
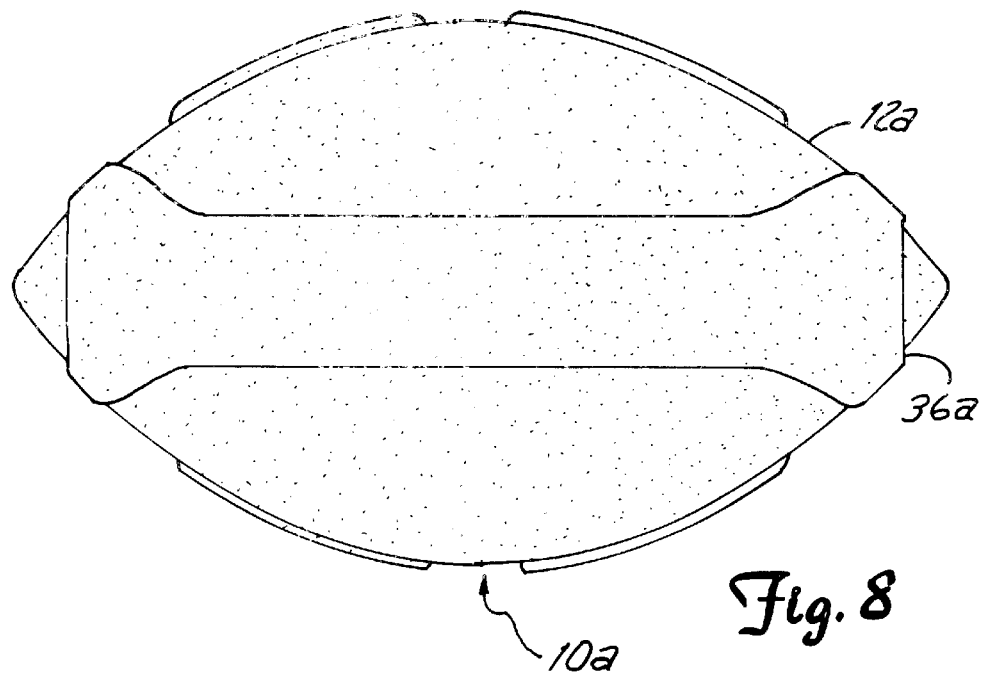

FIGS. 7 and 8 illustrate a third embodiment of the present invention, particularly suitable for large size animals, in which the body 12a is more elongated, shaped like a North American football. Protrusions 36a, again shaped somewhat like dog bones, extend along the length of the body 12a and encircle the pair of trapper cavities 14, 14a that extend through the body as illustrated in the previous embodiments. Complementary to each trapper cavity 14, 14a and bias aperture 26, 26a is a protrusion 32 and 34 and 32a and 34a, as in the previous embodiments. As shown particularly in FIG. 7, the two trapper cavities 14 and 14a may be on opposite sides of the center axis of body 12a. Alternatively, they may be on the same side.

Figure 9:
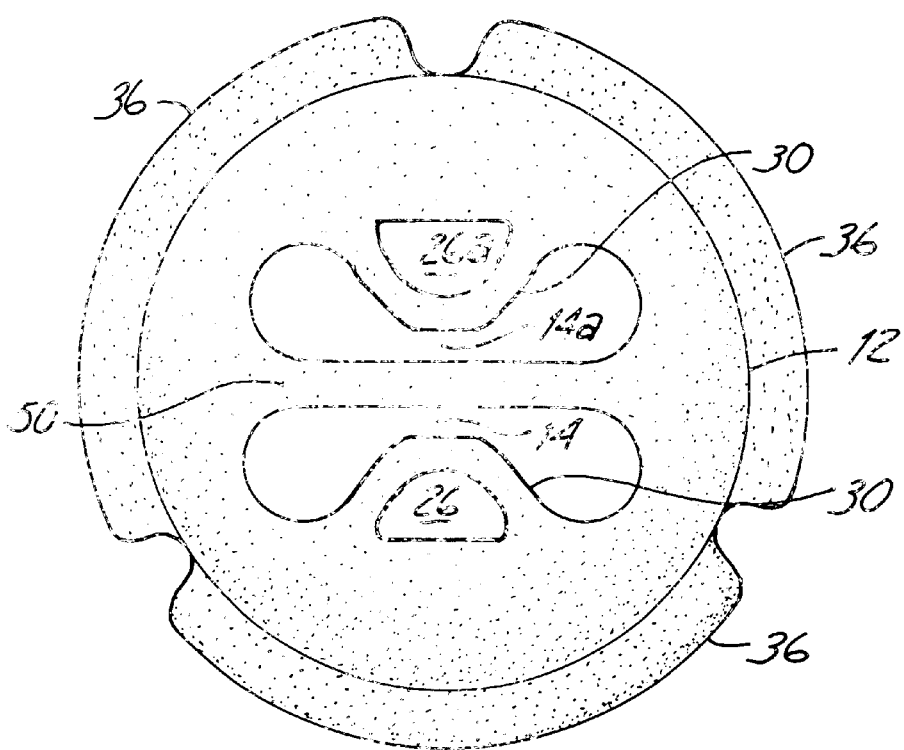
FIG. 9 is a frontal view of a pet toy in accordance with a fourth embodiment of the present invention.

FIG. 9 illustrates a fourth embodiment of the present invention, similar to the embodiment illustrated in FIGS. 5 and 6, except that instead of protrusions 32 and 34, a second trapper cavity 14a and bias aperture 26a complements the first set. Thus, in the embodiment illustrated in FIG. 9, there are two complementary trapper cavities 14 and 14a and corresponding bias apertures 26 and 26a. As in the previous embodiments, bias bridge 30 separates the respective bias aperture from the respective trapper cavity. Additionally, an elongated bias bridge 50 is formed between the two bias cavities 14, 14a, bias bridge 50 also being deformable into one of the trapper cavities upon insertion of a sensory attractant into the other. Thus, where an attractant is to be inserted into one of the trapper cavities 14, 14a, the associated bias bridge 30 deforms into the associated bias aperture 26 as previously described, and bias bridge 50 deforms into the other trapper cavity 14, 14a, permitting insertion of the sensory attractant into the one trapper cavity.

Figure 10:
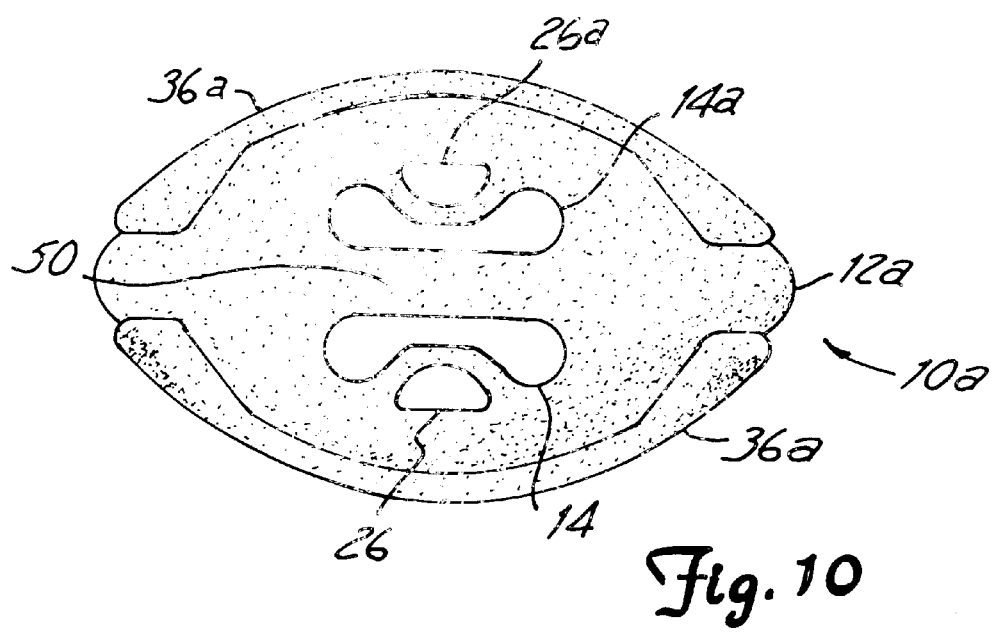
FIG. 10 is a frontal view of a pet toy in accordance with a fifth embodiment of the present invention.

FIG. 10 illustrates a fifth embodiment of the present invention, similar to that illustrated in FIGS. 7 and 8, except that a pair of complementary trapper cavities 14, 14a and bias apertures 26, 26a form a bias bridge 50 in the manner shown in FIG. 9.

Although the present invention has been described with reference to preferred embodiments, workers skilled in the art will recognize that changes may be made in form and detail without departing from the spirit and scope of the invention. The pet toy of the present invention applies a compressive force on the attractant in the trapper cavity. While the bias aperture is described as an enclosed aperture, it may be any form of a cavity that cooperates with one or more bias members to bias the wall of the trapper cavity against the attractant. Likewise, the bias bridge does not need to be continuous, as shown and described, but instead may be any bias member or members, including cantilevered lips, that bias against the attractant.

What is claimed is:

1. A non-consumable pet toy comprising:
    a substantially solid three-dimensional body formed of resilient material;
    a trapper cavity in the body having first and second opposing walls extending into the body and defining an attractant-retaining space in the trapper cavity, the trapper cavity having at least one end open to an external surface of the body to permit insertion of an animal attractant into the trapper cavity;
    a bias cavity in the body;
    a bias member in the body separating the bias cavity from the trapper cavity, the, bias member being operatively associated with the trapper cavity to bias the first wall against an attractant in the trapper cavity so that the attractant is retained between the first and second walls.

2. The pet toy of claim 1, wherein at least one end of the bias cavity is open to the external surface of the body.

3. The pet toy of claim 2, wherein the trapper cavity has two ends open to the external surface of the body and the bias cavity has two ends open to the external surface of the body.

4. The pet toy of claim 3, wherein the bias cavity is an aperture and the bias member is a continuous bridge between the aperture and the trapper cavity.

5. The pet toy of claim 1, including a plurality of elongated protrusions on the external surface of the body, the protrusions being spaced apart end to end to generally define a protruding ring on the body.

6. The pet toy of claim 1, wherein the trapper cavity extends through the body along a trapper cavity axis and the first wall is substantially parallel to the trapper cavity axis, and the bias cavity extends through the body along a bias cavity axis substantially parallel to the trapper cavity axis to permit displacement of the bias member into the bias cavity to permit insertion of an attractant into the trapper cavity.

7. The pet toy of claim 6, wherein the first and second walls of she trapper cavity terminate at first and second enlarged portions to define a width to the trapper cavity that is greater than a width of an attractant.

8. The pet toy of claim 7, wherein the body is sufficiently flexible to permit compression in a direction parallel to the width of the trapper cavity and expansion in a direction normal to the width of the trapper cavity, whereby a compressive force applied on the body in a direction parallel to the width of the trapper cavity expands the trapper cavity in a direction normal to the width of the trapper cavity to permit insertion of an attractant into the trapper cavity and upon releasing the compressive force the body relaxes to clamp the inserted attractant between the first and second walls,.

9. The pet toy of claim 7, wherein the bias cavity is spaced from the first wall and the first and second enlarged portions so that the bias member extends between the bias cavity and that much of the trapper cavity defined by the first wall and the first and second enlarged portions.

10. The pet toy of claim 7, wherein the bias cavity is an aperture and the bias member is a continuous bridge between the aperture and the trappercavity.

11. The pet toy of claim 6, including a plurality of elongated protrusions on the external surface of the body, each protrusion having a generally bone shape with the protrusions being arranged end to end in a ring on the body such that the heads of the bone shapes are spaced apart.

12. The pet toy of claim 1, wherein the first-named trapper cavity has a trapper cavity axis substantially parallel to the first and second walls, the pet toy further including:
    a second trapper cavity having third and fourth opposing walls extending into the body substantially parallel to the axis of the first trapper cavity, the second trapper cavity having at least one end open to the external surface of the body to permit insertion of an animal attractant into the second trapper cavity, the open ends of the first and second trapper cavities being adjacent to each other such that the second and fourth walls are adjacent;

a second bias cavity in the body; and a second bias member separating the second bias cavity from the second trapper cavity, the second bias member being operatively associated with the second trapper cavity to bias the third wall against an attractant in the second trapper cavity so that the attractant is retained between the third and fourth walls.

13. The pet toy of claim 12, wherein the first and second walls of the first trapper cavity terminate at first and second enlarged portions to define a width to the first trapper cavity that is greater than a width of an attractant, and the third and fourth walls of the second trapper cavity terminate at third and fourth enlarged portions to define a width to the second trapper cavity that is greater than width of an attractant.

14. The pet toy of claim 13, wherein the first bias cavity is spaced from the first wall and the first and second enlarged portions so that the first bias member extends between the first bias cavity and that much of the first trapper cavity defined by the first wall and the first and second enlarged portions, and the second bias cavity is spaced from the third wall and the third and fourth enlarged portions so that the second bias member extends between the second bias cavity and that much of the second trapper cavity defined by the third wall and the third and fourth enlarged portions.

15. The pet toy of claim 12, including a bias bridge between the second and fourth walls operatively associated with the first and second trapper cavities to bias the respective second and fourth walls against respective attractants in the first and second trapper cavities.

16. The pet toy of claim 12, wherein the first and second bias cavities are respective first and second apertures and the first and second bias members are respective first and second continuous bridges between the respective aperture and trapper cavity.

17. The pet toy of claim 16, including a third bias bridge between the second and fourth wall operatively associated with the first and second trapper cavities to bias the respective second and fourth walls against respective attractants in the first and second trapper cavities.

18. A non-consumable pet toy comprising a three-dimensional body formed of substantially solid resilient material, the body having:

a trapper cavity having first and second opposing walls extending into the body and defining an attractant retaining space between them, the trapper cavity having at least one end open to an external surface of the body to permit insertion of an animal attractant into -the trapper cavity, the first and second walls of the trapper cavity terminating at first and second enlarged portions to define a width to the trapper cavity that is greater than a width of an attractant; and the body being sufficiently flexible to permit compression in a direction parallel to the width of the trapper cavity and expansion in a direction normal to the width of the trapper cavity, whereby a compressive force applied on the body in a direction parallel to the width of the trapper cavity expands the trapper cavity in a direction normal to the width of the trapper cavity to permit insertion of an attractant into the trapper cavity and upon releasing the compressive force the body relaxes to clamp the inserted attractant between the first and second walls.

19. The pet toy of claim 18, including a plurality of elongated protrusions on the external surface of the body, the protrusions being spaced apart end to end to generally define a protruding ring on the body.

20. The pet toy of claim 18, wherein the first-named trapper cavity has a trapper cavity axis substantially parallel to the first and second walls, the pet toy further including:

a second trapper cavity having third and fourth opposing walls extending into the body substantially parallel to the axis of the first trapper cavity, the second trapper cavity having at least one end open to the external surface of the body to permit insertion of an animal attractant into the second trapper cavity, the open ends of the first and second trapper cavities being adjacent to each other such that the second and fourth walls are adjacent;

the body being sufficiently flexible to permit compression in a direction parallel to the widths of the trapper cavities and expansion in a direction normal to the widths of the trapper cavities, whereby the compressive force on the body in a direction parallel to the widths of the trapper cavities expands the trapper cavities in a direction normal to the widths of the trapper cavities to permit insertion of attractants into the trapper cavities and upon releasing the compressive force the body relaxes to clamp the inserted attractants in the first trapper cavity between the first and second walls and in the second trapper cavity between the third and fourth walls.

21. The pet toy of claim 20, including a bias bridge between the second and fourth walls operatively associated with the first and second trapper cavities to bias the respective second and fourth walls against respective attractants in the first and second trapper cavities.

\* \* \* \* \*